(12) United States Patent
Balbirsky et al.

(10) Patent No.: US 7,974,969 B1
(45) Date of Patent: Jul. 5, 2011

(54) APPARATUS, METHOD AND COMPUTER-CODE FOR QUANTIFYING INDEX OVERHEAD

(75) Inventors: Rafi Balbirsky, Tel Aviv (IL); Ilanit Nulman, Oranit (IL)

(73) Assignee: Precise Software Solutions Inc., Redwood Shores, CA (US)

( * ) Notice: Subject to any disclaimer, the term of this patent is extended or adjusted under 35 U.S.C. 154(b) by 482 days.

(21) Appl. No.: 12/188,181

(22) Filed: Aug. 7, 2008

Related U.S. Application Data

(60) Provisional application No. 61/086,792, filed on Aug. 6, 2008.

(51) Int. Cl.
*G06F 17/30* (2006.01)
*G06F 7/00* (2006.01)
(52) U.S. Cl. ......... 707/713; 707/673; 707/725; 707/741
(58) Field of Classification Search .................. None
See application file for complete search history.

(56) References Cited

U.S. PATENT DOCUMENTS

| | | | | |
|---|---|---|---|---|
| 5,398,335 | A * | 3/1995 | Lewis | 1/1 |
| 6,772,179 | B2 * | 8/2004 | Chen et al. | 1/1 |
| 7,673,291 | B2 * | 3/2010 | Dias et al. | 717/127 |
| 2003/0114949 | A1 * | 6/2003 | Armstrong et al. | 700/107 |
| 2005/0187917 | A1 * | 8/2005 | Lawande et al. | 707/3 |
| 2006/0146729 | A1 * | 7/2006 | Krautkremer et al. | 370/252 |
| 2007/0253595 | A1 * | 11/2007 | Sorensen | 382/103 |

* cited by examiner

*Primary Examiner* — Greta L Robinson
*Assistant Examiner* — James J Wilcox
(74) *Attorney, Agent, or Firm* — Mark M. Friedman

(57) ABSTRACT

Apparatus, methods, and computer readable medium for monitoring a database and for determining an estimated index-overhead for a given index is provided. A description of database performance may be presented to a user in accordance with the determined index overhead. Furthermore, in some embodiments, apparatus, methods and computer-code for (i) determining fractional aggregate index-wait time in accordance with database statement execution plans and (ii) presenting a description of database performance in accordance with the fractional aggregated index-wait time are also disclosed.

20 Claims, 12 Drawing Sheets

US 7,974,969 B1

APPARATUS, METHOD AND COMPUTER-CODE FOR QUANTIFYING INDEX OVERHEAD

This patent application claims the benefit of U.S. Provisional Patent Application No. 61/086,792 filed Aug. 6, 2008 by the present inventors

BACKGROUND OF THE INVENTION

1. Field of the Invention

The present invention relates to methods, apparatus and computer-code for acquiring and presenting information describing database performance.

2. Related Art

Although database indexes are useful for facilitating faster execution of "select" database statements, it is known that database indices can sometimes slow the execution of certain database 'data-writing' database statements, such as UPDATE/DELETE/INSERT statements. This is because when data is added to one or more tables, there may be an index 'cost' or 'overhead' associated with maintaining the index—i.e. instead of adding 'new data' to only the table, the 'new data' must be added to the index as well (or alternatively, the index must be modified to change or delete existing data within the index—this must be done both for the index as well as the table), impeding execution of the 'data-writing' database statement.

Because of the potential 'risk' of performance degradation associated with creating too many indexes (or the wrong indexes), a skilled database administrator (DBA) will attempt to create indexes intelligently. Unfortunately, it is not always apparent a priori which indexes, on the whole, improved database performance and which indexes impede database performance.

There is an ongoing need for tools and techniques for determining the "cost" of any given index—i.e. what is total the overhead (i.e. when executing 'data-writing' statements such as UPDATE/DELETE/INSERT statements) for a given workload and/or over a given time interval.

SUMMARY OF EMBODIMENTS

Embodiments of the present invention provide a tool and technique for monitoring database performance over a time interval, and in accordance with information obtained by monitoring database performance, determining the total "index overhead" of an index (i.e. for database statements executed during the time period) on a per-index basis (i.e. each index may be associated with a different respective total or aggregate "cost" of index maintaining the index). In accordance with this total cost, information related to database performance may be presented to a user such as a DBA.

During a given time interval, 'index read operations' may be classified into two (or more) categories: (1) (CATEGORY A) performance-accelerating index-read operations (e.g. where the reading of data from the index accelerates execution of the database statement) and (2) (CATEGORY B) 'overhead' or 'maintenance' index read-operations. The second category (i.e. overhead index-read operations) may relate to index-read operations that are carried out in order to modify index data or add data to the index—i.e. first index is read from diski into volatile memory in the 'overhead' 'index-read operation' (i.e. which is associated with wait time—sometimes a significant amount of wait time), and then, at a later time, the index is modified or added to in volatile memory and written back to disk.

For a given index over a given time interval, there are situations where (i) a plurality of index-read operations of CATEGORY A are carried out and (ii) a plurality of index-read operations of CATEGORY B are also carried out. Therefore, for many or even most indexes indexes, the aggregate wait time associated with maintaining the index (i.e. the index overhead) over a given time period (i.e. when there are multiple index-read operations) may be only a fraction of the total index-read wait time associated with all index-read operations—i.e. the aggregate 'index overhead wait time' of multiple index-read operations may be only a 'fractional aggregate index-read wait time' for the time interval.

Embodiments of the present invention relate to apparatus, techniques and computer-readable medium where (i) an estimate of the total wait time associated with multiple index-read operations of CATEGORY A is determined for a given or target database index and (ii) in accordance with this estimated total wait time (i.e. which is only a 'fraction' of the total wait time which includes wait time of both index-read operations of CATEGORY A and index-read operations of CATEGORY B), information related to database performance may be presented to a user such as a DBA.

In one non-limiting example, a representation of the total or aggregate wait time of index-read operations of CATEGORY A (i.e. the aggregate 'index-overhead' read time) is presented to a user.

In another non-limiting example, a representation of a ratio between (i) a total or aggregate time of index-read operations of CATEGORY A (i.e. the aggregate 'index-overhead' read time) and (ii) a total or aggregate time of all index-read operations (i.e. including both index-read operations of CATEGORY A and index-read operations of category 13—i.e. including BOTH performance-accelerating and index-overhead read operations) is presented to a user. Thus, in one use case, a user (e.g. a DBA) may be informed a given fraction (i.e. any fraction for example any fraction >0 and <1—for example, 1% or 10% or 30% or 50% or 80% or any other percentage) of all index-read wait time is associated with 'index-overhead." In the event that a relatively "high" ratio is presented, the user may be advised to tune an index (or group of indexes) or a table (or group of tables) or database statement (or group of statements) in order to reduce index-overhead.

In yet another example, a list of database indexes (or tables or statements) may be presented in accordance with index-overhead values. In one example, the list may be sorted so the "bad" indexes (i.e. with a high absolute index-overhead wait time or where index-overhead is a high fraction of total index-read wait time) or associated tables or statements are presented at the "top" or beginning of a list.

It is now disclosed for the first time a method for displaying information related to performance of a multi-index database having a plurality of indexes during a time interval, the method comprising: a) for each index-read detecting of a plurality of index-read detectings that occur during the time interval: i) determining an identity of the target index and a data-writing triggering data-writing database statement of the detected index-read; i) quantifying a respective amount of wait time associated with the index-read detecting; and iii) in accordance with an execution plan of the triggering data-writing database statement, classify the detected index-read as either a performance-accelerating index-read or an overhead index-read; b) for each index of a plurality of indexes of the database, determining, in accordance with results of the quantifying and classifying operations, a respective aggregate index overhead wait time for the time interval; and c) in accordance with one or more of the determined index overhead wait times, presenting, to a user, data describing performance of the database during the time interval.

In some embodiments, the data presenting includes presenting, for a given index of the plurality of indexes, a representation of a non-unity and non-zero ratio between: i) a total aggregate overhead index-read wait-time for the given index; and ii) a total aggregate index-read wait-time for the given index.

In some embodiments, the data presenting includes presenting, for a given index of the plurality of indexes, a representation of a non-unity, non-zero ratio between: i) a total aggregate overhead index-read wait-time for the given index; and ii) a total aggregate performance-accelerating index-read wait-time for the given index.

It is now disclosed for the first time a method for displaying information related to performance of a database during a time interval, the method comprising: a) during the time interval, effecting a plurality of index-read detectings, each index-read detecting being associated with a respective quantity of wait-time; b) for each index-read detecting of the plurality of index-read detectings: i) determining an identity of a respective target index for the detected index-read; ii) determining an identity and an execution plan of a respective invoking database statement; and iii) determining a respective database index-execution plan relationship between the respective target index and the execution plan of the respective database statement; c) in accordance with: i) the wait-time quantities; and ii) target index-execution plan relationships,
  determining, for a given index of the database and for the time interval, a fractional aggregate index-read wait time (in one example, the 'fractional aggregate index-read wait time' may be the 'aggregate index-overhead time' or the total wait time of 'index-overhead-associated' index-reads during the time interval) that is only a fraction of a total index-read wait time for the given index for the time interval; and
  d) in accordance with the fractional aggregate index-read wait times determined for one or more given indexes, presenting, to a user, a description of performance of the database during the time period.

In some embodiments, the execution plans are estimated execution plans.

In some embodiments, the execution plans real are real execution plans, the method further comprises: e) monitoring the database during the time intervals to detect one or more real execution plans associated with the invoking database statement.

In some embodiments, the determined relationship is a presence-absence relationship describing if the respective target index is present in or absent from the execution plan of the respective triggering database statement.

In some embodiments, the fractional aggregate index-read wait time for the time interval describes a total index overhead during the time interval. In some embodiments, i) the method further comprises: e) determining a ratio between the fractional aggregate index-read wait time for the given index and a total index-read wait time for the given index; and ii) the description of the performance of the database during the time period is presented in accordance with the determined ratio.

In some embodiments, the presenting of the performance description includes presenting a description of the determined ratio.

In some embodiments, i) for each database index of a plurality of database indexes, a respective ratio is determined; and ii) the presenting includes presenting each ratio to present a plurality of ratio descriptions.

In some embodiments, i) the method further comprises: e) for a given database table having a plurality of indexes determining a table-wide fractional aggregate index-read wait time in accordance with a respective fractional aggregate index-read wait times of each index of the plurality of indexes; and ii) the description of the performance of the database during the time period is presented in accordance with the determined table-wide fractional aggregate index-read wait time.

In some embodiments, i) the method further comprises: e) for a given database table having a plurality of indexes, determining, from a respective fractional aggregate index-read wait times of each index of the plurality of indexes, a table-wide ratio between: A) a table-wide fractional aggregate index-read wait time; and B) a total wait-time for the database table; and ii) the description of the performance of the database during the time period is presented in accordance with the determined table-wide ratio for the given database table.

In some embodiments, i) step (a) is carried out for a plurality of distinct database indexes; and ii) the database performance description presenting include displaying a list of at least some of the database indexes of the plurality of database statements in accordance with the respective fractional aggregate index-read wait times for each database index of the plurality of database indexes.

Thus in one example, a list of database indexes are presented, and they may be sorted and/or filtered such that indexes with a 'high' index-overhead are presented in a list (or their presenting is contingent on the index-overhead exceeding some sort of absolute or relative minimum value).

In some embodiments, the displayed list of database indexes is sorted in accordance with relative values of the estimated aggregate fractional aggregate index-read wait times. Thus, in one particular use case, the database indexes (i.e. descriptions thereof) are sorted so that the ones which have the greatest 'index-overhead' times are presented first.

Alternatively or additionally, it may be recognized that a information about a potentially large number of indexes may be presented. In order to "push" the most relevant information to a user (i.e. a DBA) and to reduce the change of "information overload," it may be possible to only present information about the "most problematic indexes."

Thus, in some embodiments, the database statement list displaying includes: i) selecting a sub-plurality of database indexes from the plurality of distinct database indexes in accordance with the relative estimated aggregate sort-query-results-on-disk wait times; and ii) presenting only the selected sub-plurality of database indexes.

It is now disclosed for the first time a system for displaying information related to performance of a database during a time interval, the system comprising: A) a performance data-handler operative: a) during the time interval, to effect a plurality of index-read detectings, each index-read detecting being associated with a respective quantity of wait-time; b) for each index-read detecting of the plurality of index-read detectings: i) to determine an identity of a respective target index for the detected index-read; ii) to determine an identity and an execution plan of a respective invoking database statement; and iii) to determine a respective database index-execution plan relationship between the respective target index and the execution plan of the respective database statement; c) in accordance with: i) the wait-time quantities; and ii) target index-execution plan relationships, to determine, for a given index of the database and for the time interval, a fractional aggregate index-read wait time that is only a fraction of a total index-read wait time for the given index for the time interval;

and B) a performance-data presentation interface operative in accordance with the fractional aggregate index-read wait times determined for one or more given indexes, to present, to a user, a description of performance of the database during the time period.

In some embodiments, the performance data-handler is operative such that the execution plans are estimated execution plans.

In some embodiments, the performance data-handler is operative such that the execution plans real are real execution plans, the performance data-handler is further operative to: e) monitor the database during the time intervals to detect one or more real execution plans associated with the invoking database statement.

In some embodiments, the performance data-handler is operative such that the determined relationship is a presence-absence relationship describing if the respective target index is present in or absent from the execution plan of the respective triggering database statement.

It is now disclosed for the first time a computer readable medium comprising program instructions, the computer readable medium for facilitating the display of information related to performance of a multi-index database having a plurality of indexes during a time interval wherein when executed the program instructions are operable to: a) for each index-read detecting of a plurality of index-read detectings that occur during the time interval: i) determine an identity of the target index and a data-writing triggering data-writing database statement of the detected index-read; i) quantifying a respective amount of wait time associated with the index-read detecting; and iii) in accordance with an execution plan of the triggering data-database statement, classify the detected index-read as either a performance-accelerating index-read or an overhead index-read; b) for each index of a plurality of indexes of the database, determining, in accordance with results of the quantifying and classifying operations, a respective aggregate index overhead wait time for the time interval; and e) in with one or more of the determined index overhead wait times, presenting, to a user, data describing performance of the database during the time interval.

It is now disclosed for the first time a system for displaying information related to performance of a multi-index database having a plurality of indexes during a time interval, the system comprising: A) a performance data-handler operative to: a) for each index-read detecting of a plurality of index-read detectings that occur during the time interval: i) determining an identity of the target index and a data-writing triggering data-writing database statement of the detected index-read; i) quantifying a respective amount of wait time associated with the index-read detecting; and iii) in accordance with an execution plan of the triggering data-writing database statement, classify the detected index-read as either a performance-accelerating index-read or an overhead index-read; b) for each index of a plurality of indexes of the database, determining, in accordance with results of the quantifying and classifying operations, a respective aggregate index overhead wait time for the time interval; and B) a performance-data presentation interface operative, in accordance with one or more of the determined index overhead wait times, presenting, to a user, data describing performance of the database during the time interval.

It is now disclosed for the first time a computer readable medium comprising program instructions, the computer readable medium for facilitating the display of information related to performance of a multi-index database having a plurality of indexes during a time interval wherein when executed the program instructions are operable to: a) during the time interval, effecting a plurality of index-read detectings, each index-read detecting being associated with a respective quantity of wait-time; b) for each index-read detecting of the plurality of index-read detectings: i) determining an identity of a respective target index for the detected index-read; ii) determining an identity and an execution plan of a respective invoking database statement; and iii) determining a respective database index-execution plan relationship between the respective target index and the execution plan of the respective database statement; c) in accordance with: i) the wait-time quantities; and ii) target index-execution plan relationships, determining, for a given index of the database and for the time interval, a fractional aggregate index-read wait time that is only a fraction of a total index-read wait time for the given index for the time interval; and d) in accordance with the fractional aggregate index-read wait times determined for one or more given indexes, presenting, to a user, a description of performance of the database during the time period.

These and further embodiments will be apparent from the detailed description and examples that follow.

Figure 1:
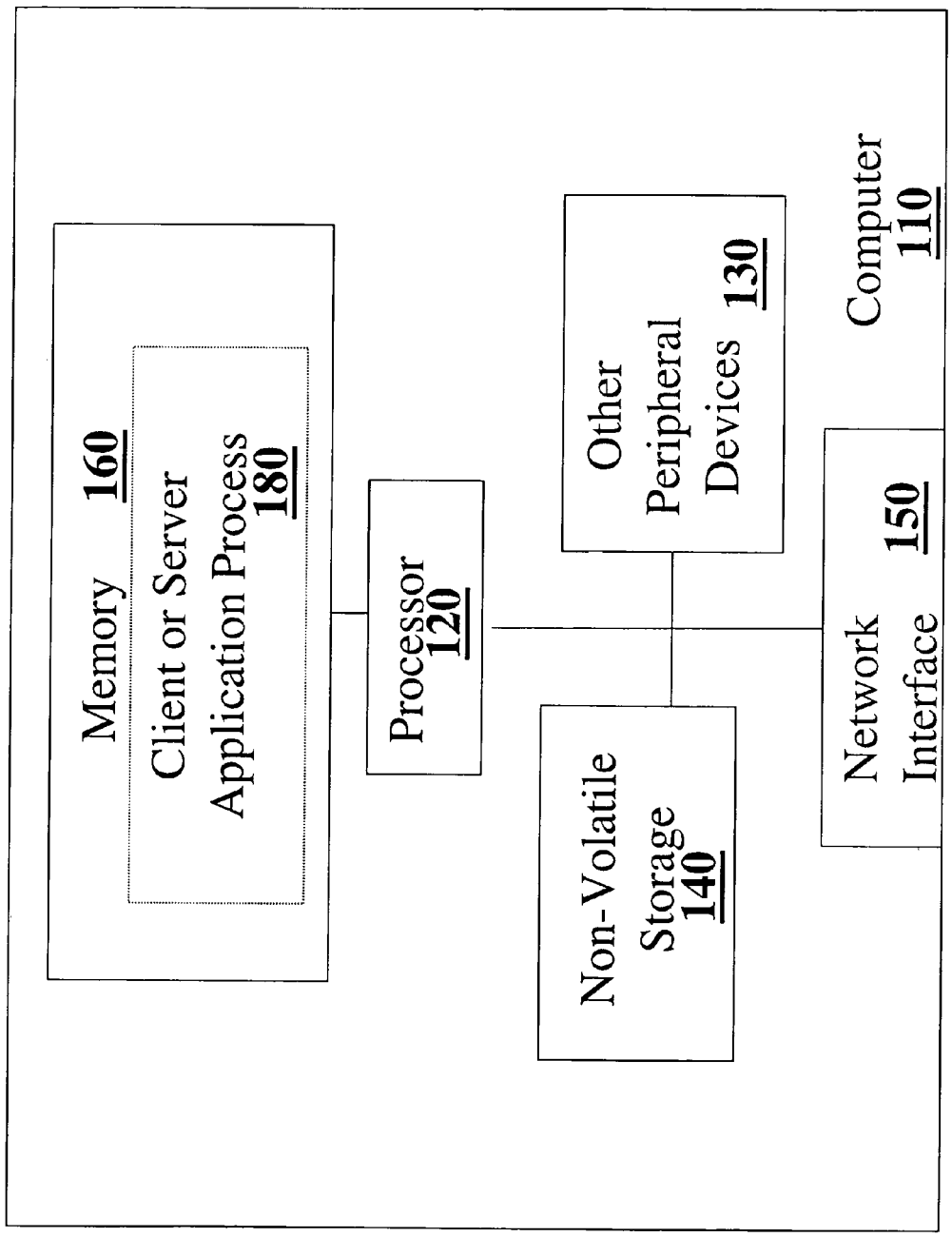
FIG. 1 is a block diagram of a computer in accordance with exemplary embodiments of the present invention.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word may is used in a permissive sense (i.e., meaning having the potential to'), rather than the mandatory sense (i.e. meaning must).

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed system, method and computer-readable code for display information related to database performance in accordance with categorized index-read wait times is necessary to implement the invention as claimed in any particular one of the appended claims. Various elements and features of devices are described to fully enable the invention. It should also be understood that throughout this disclosure, where a process or method is shown or described, some of the steps of the method may be performed in any order or simultaneously, unless it is clear from the context that one step depends on another being performed first. The general principles described herein may be applied to other embodiments and applications without departing from the scope of the invention. Thus, the present invention is not to be limited to the embodiments shown, but is to be accorded the widest scope consistent with the principles and features described herein.

In one embodiment, a database performance-analysis tool (i.e., an apparatus, a computer-implemented method and/or computer code for monitoring a database) presents data descriptive of performance of a database (e.g. a relational database) in accordance with an aggregate wait time of index-read operations that are associated with 'index overhead' or 'index maintenance.'

Towards this end, it may be useful to monitor the relational database over a time interval by effecting a plurality of index-read detectings at different times during the time interval. In one non-limiting example, "system data" of the database is read repeatedly (e.g. by reading 'system memory' or one or more 'system tables' of the database)—for example, at least once a second or at least once every few seconds. Each time the system data is read, it is determined: (i) if a database statement is 'waiting' for an index read carried out by the database; (ii) the circumstances of the index read.

In particular, the index read may be classified as either (i) an index read that is improves the performance of the currently-executed database statement that 'triggered' this index read—e.g. because the index reading eliminates the need to read data from the table and/or because the index reading retrieves information (e.g. a reference to a row or rows in the table) which allows data to be read from the table 'faster' than would be otherwise possible (i.e. CATEGORY A) (for example, a range-scan or a unique scan or a full-index scan or any other 'idex-scan' directive appearing in an execution plan); or (ii) an index read that is required as part of an 'index maintenance' or 'index overhead operation'—e.g. where index data is read into volatile memory, modified in volatile memory, and then read back to disk (CATEGORY B).

It is appreciated that for certain types of 'triggering' database statements this categorization may be 'easy'—e.g. if the database statement is a statement which only retrieves data without writing data, then it is clear that the detected index-read of CATEGORY A, and 'helps' or 'accelerates' the execution of the database statement.

On the other hand, for 'data-writing' database statements which have the potential to modify an index (for example, UPDATE/DELETE/INSERT) it may be necessary to analyze the execution path of the 'data-writing' database statement. In the event that the index appears in the execution path of the 'data-writing' database statement, it may be assumed that the Query Optimizer (i.e. which generated the execution path) chose to include the index read in order to accelerate data-retrieval and thereby execute statement execution.

In different embodiments, the time interval may be at least a minute, at least an hour, at least 12 hours, at least a day, at least several days, at least a week, at least several weeks, etc.

The presented performance data may be useful for assisting the database administrator when "tuning" the database to maintain and/or improve database performance.

The presently disclosed apparatus and method may be implemented using any combination of computer-executable code modules and hardware. In one embodiment, the presently disclosed apparatus is implemented using a single computer device or a plurality of computer devices in communication with each other.

A Discussion of FIG. 1

FIG. 1 illustrates one embodiment of a computer 110 including a processor 120. Processor 120 is shown coupled to a memory 160, a non-volatile storage 140, a video display device 135, a mouse 145, a keyboard 155, and a network interface 150 such as a network interface card. It is appreciated that not every element is required in every embodiment.

Processor 120 may be configured to execute instructions and to process data according to a particular instruction set architecture (ISA). In one embodiment, processor 120 may be configured to implement an x86 compatible ISA, although in other embodiments it is contemplated that any desired ISA may be employed, such as the SPARC V9 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.).

In various embodiments, memory 160 may comprise any suitable type of system memory as described above, such as FB-DIMM, DDR/DDR2 SDRAM, or RDRAM☐, for example. Memory 160 may include multiple discrete banks of memory. Also, in some embodiments memory 160 may include multiple different types of memory.

In some embodiments, computer 110 may include more than one instance of the devices shown, such as more than one processor 120, for example. In various embodiments, computer 110 may be configured as a rack-mountable server system, a standalone system, or in any other suitable form factor. In different embodiments, computer 110 may be configured as a client system or as a server system.

Figure 3:
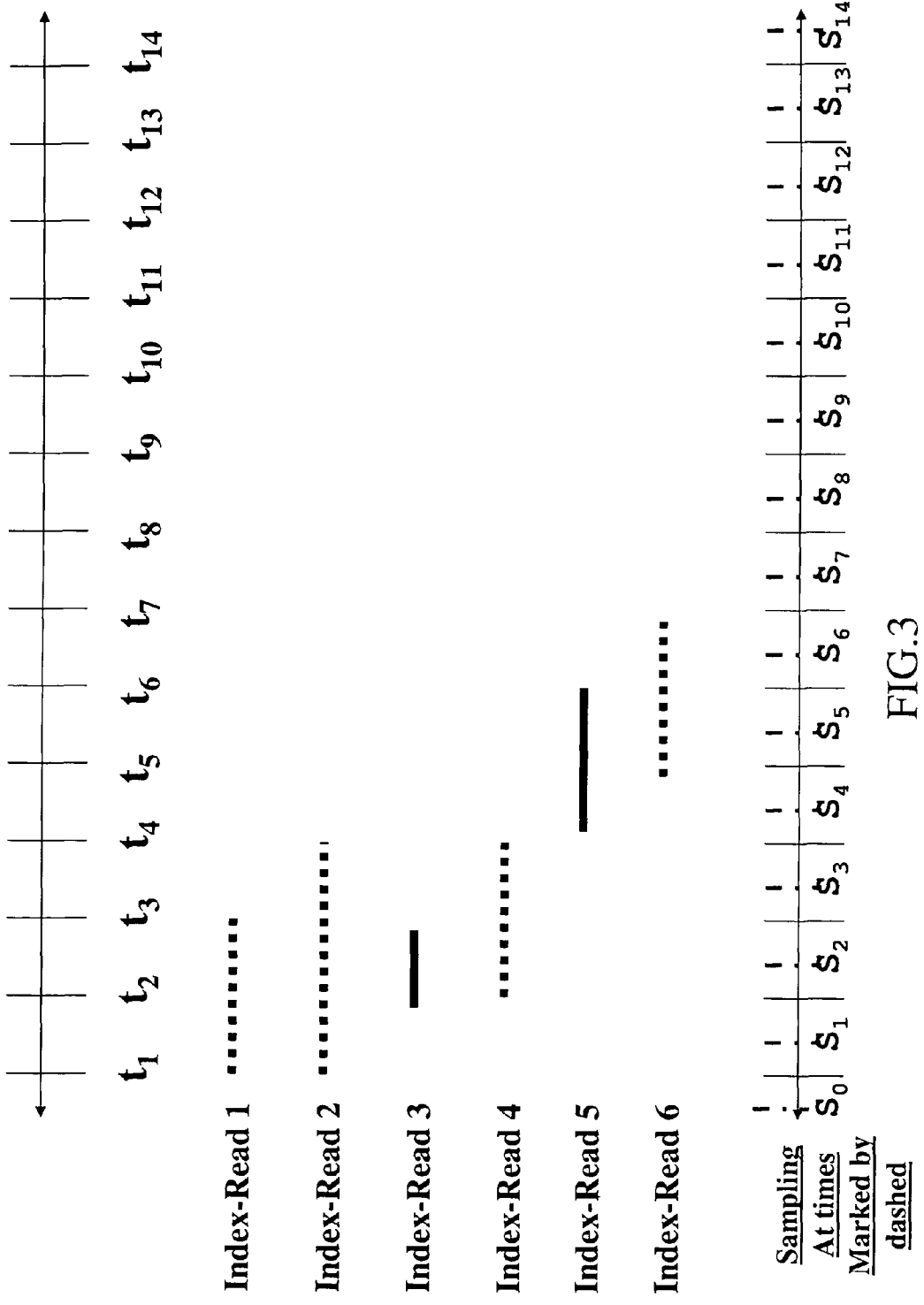
FIG. 3 describes an example where index-read operations of CATEGORY A and of CATEGORY B are carried out by a database.

In one embodiment, processor 120 may be configured to run operating system software such as Microsoft Windows, IBM AIX or Sun Microsystems Solaris. Operating system software may in turn provide an environment in which processor 120 may execute additional software modules in the form of applications, programs, or processes designed to perform specific functions. Running operating system software or software modules may comprise executing instructions that are stored in memory 160. As shown in FIG. 3, a client or server application process resides in the memory 160.

Software modules that may be executed by processor 120 may include, in one embodiment, client/server software such as a web server or a web browser. Alternatively, or in addition, processor 120 may execute software modules comprising network management software, office productivity tools, e-mail programs, etc. Many other types of software may be executed such as a virtual machine runtime environment, a database, an application server, and diagnostic, monitoring, profiling, or analysis software. Furthermore, while executing such software, processor 120 may retrieve data from and store data in non-volatile storage 140 or in memory 160.

As shown in FIG. 1, a client or server application process 180 to be performance-monitored resides in memory 160. In one embodiment, one or more software processes may perform the function of profiling other software processes (e.g. process 180) during operation, gathering and storing data indicative of the operation of one or more of the other software processes. The performance-monitored software application may reside on computer 110. Alternatively or additionally, the performance-monitored software application may reside on a different computer. These monitored application (i.e. database management system) may reside on a single computer 110 or may be a distributed or clustered application residing on a plurality of computers 110.

DEFINITIONS

For convenience, in the context of the description herein, various terms are presented here. To the extent that definitions are provided, explicitly or implicitly, here or elsewhere in this application, such definitions are understood to be consistent with the usage of the defined terms by those of skill in the pertinent art(s). Furthermore, such definitions are to be construed in the broadest possible sense consistent with such usage.

In the present disclosure, an 'execution plan' or a 'query plan' or a 'query execution plan' is a set of steps used to access information in a SQL relational database. Typically, each execution plan is associated with a different 'cost' indicative of a service time and/or amount of resources required to effect the SQL database query using the given plan. Thus, most SQL relational database include a query optimization engine or 'query optimizer' that, when handling an SQL query, may evaluate the cost of one or more execution plans and select the optimal execution plan.

In the present disclosure, a 'data-writing database statement' is a database statement where a table and/or an index is modified, either by changing data already residing on the table and/or index, and/or by adding new data and/or by deleting data.

Some embodiments relate to a "database index-execution plan" relationship between a 'target' index read at a certain time and an execution plan of the 'invoking' or 'triggering' database statement whose execution at a given time requires reading the 'target index.' In one example, the "database index-execution plan" relationship is a Boolean relation which is "true" if the database index 'appears' in the execution plan (i.e. if the execution plan provides a directive to read the 'target' or 'given' index). In this case, the 'database index-execution plan' relation is a 'presence-absence' relation that is 'true' if an identifier of the 'target index' or 'given index' (i.e. for which index-read state is detected) is present in the execution plan of the 'triggering' or "invoking" database statement, and 'false' of the identifier is absent from the execution plan. In another example of "database index-execution plan" relationship, the "database index-execution plan" relationship may indicate the 'type' of index reading provided by the execution plan—for example, whether the target index reading is a 'range scan' or a 'unique scan' or a 'full-index scan.'

For the present disclosure, execution of a database statement may entail reading one or more database indexes. At the time the index is being read, the database statement may require the data read from the index, and may thus 'wait' for the index operation. Thus, the time that the database statement 'waits' for the data read from the index is 'wait time' associated with an 'index read operation.'

A 'target' index is an index for which a given database statement is 'waiting.'

For the present disclosure, a 'performance-accelerating index read' is an index read is an index-read carried out in accordance with an execution plan provided by the Query Optimizer where, according to the calculations of the Query Optimizer, the database statement executes faster when the index-read is carried out than if the index-read is not carried out. Thus, the "Query Optimizer" may determine if an index read is performance-accelerating or not.

An "index-maintenance' index read is a read of the index for the purpose of updating the index on disk by first reading the index (or a portion thereof) into volatile memory.

In the event that an index-read operation is required both for performance-acceleration (i.e. as determined by the Query Optimizer) and for index-maintenance, then there is no 'cost' of reading the index for the purpose of index-maintenance (i.e. since the index is read into volatile memory anyhow as directed by the Query Optimizer), and then the index-read may be classified as a 'performance-accelerating' index read rather than as an 'index-maintenance' or 'index-overhead' index read (i.e. CATEGORY A only).

When a database statement that is "involved" in a "index-read" operation, execution of the database statement causes (i.e. as an 'intermediate step' during execution of the database statement) the "index-read" operation—i.e. during execution of the database statement, the 'given index' or 'target index,' and optionally one or more additional indexes, are read.

During a time interval, a "given" database index may be read multiple times, and may be "involved" with multiple distinct "index-reads" operations. The aggregate "index-read" wait time is the total wait time (i.e. the total amount of time that database statement(s), whose execution causes a read of the given index, must wait for reading of the 'given database index' to complete during execution), summed over all of the "index-read" operations.

As noted, some index-reads may be carried out as part of index maintenance (CATEGORY A) or as index overhead (CATEGORY B).

During a time interval, a "given" database index may be read (i.e. in accordance with a directive generated by the Query Optimizer that appears in an execution plan) multiple times, and may be "involved" with multiple distinct performance-accelerating "index-reads" operations. The aggregate "performance-accelerating index-read" wait time is the total wait time (i.e. the total amount of time that database statement (s), whose execution causes a 'performance-accelerating' read of the given index, must wait for these 'performance-accelerating' readings of the 'given database index' to complete during execution), summed over all of performance-accelerating "index-read" operations (CATEGORY A—aggregate).

During a time interval, a "given" database index may be read multiple times for the purpose of index maintenance, and may be "involved" with multiple distinct 'index-overhead' index-read operations. The aggregate "index-overhead' index-read" wait time is the total wait time (i.e. the total amount of time that database statement(s), whose execution causes a 'index-maintenance' read of the given index, must wait for these 'index-maintenance' readings of the 'given database index' to complete during execution), summed over all of index-maintenance "index-read" operations (CATEGORY B—aggregate).

Since the total wait time of index-read may be greater than the index-read wait time attributable to CATEGORY A or CATEGORY B (or any other defined category), the aggregate wait times of CATEGORY A or B may be referred to as "fractional aggregate wait time" which are less than 100% and more than 0% the total index-read wait time during the time interval.

Figure 2:
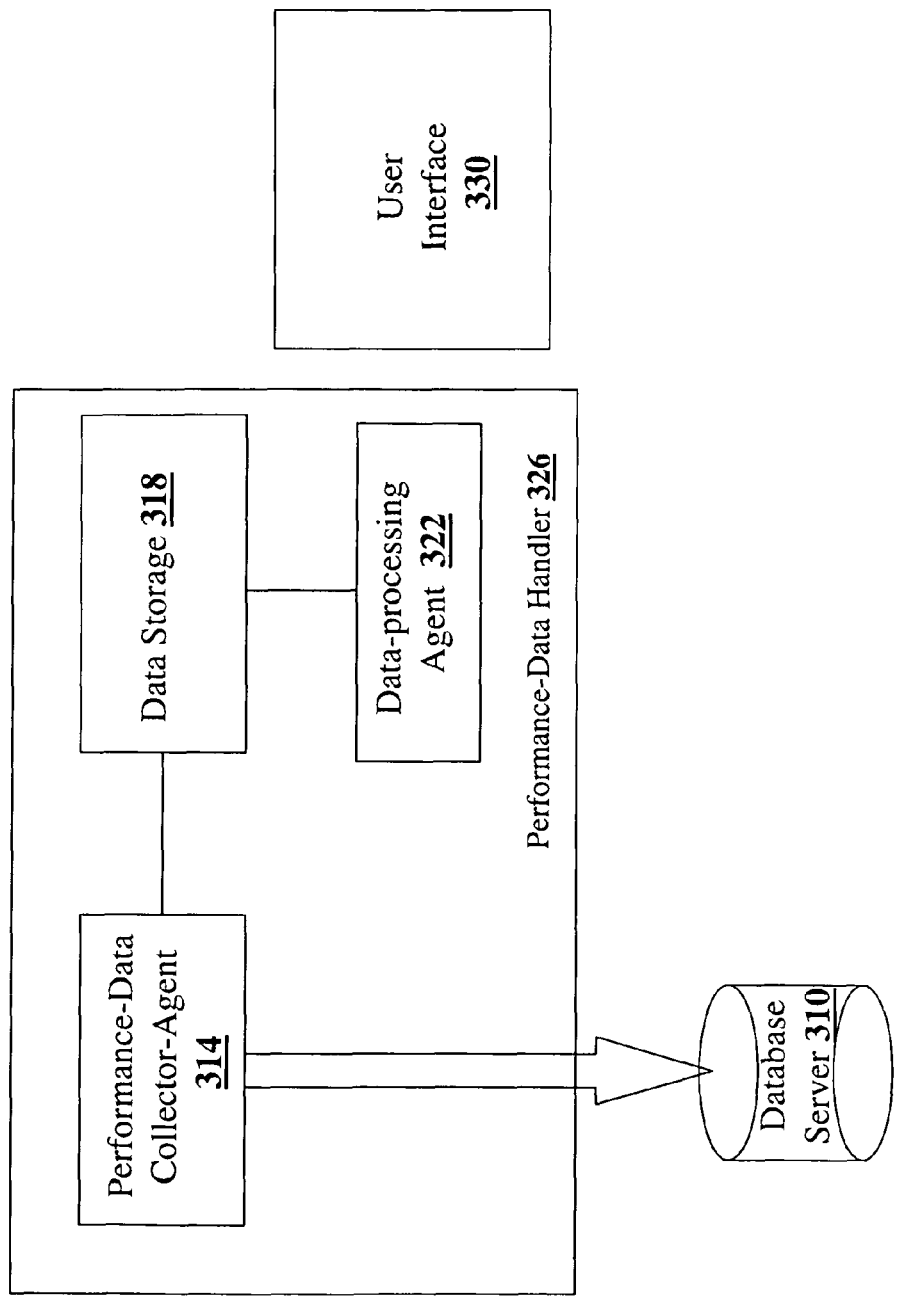
FIG. 2 is a block diagram of a system for performance-monitoring a database in accordance with some embodiments.

Discussion of FIG. 2

FIG. 2 provides a block diagram of an exemplary architecture for (a) collecting performance data for an executing configurable database 310 including data describing whether or not an "index-read" operation is occurring at a given 'sample' time and/or an identity of a database index which is "involved" with the index-read operation; (b) storing the collected performance data in a data storage 318; (c) analyzing or processing the data, using data-processing agent 322 which may 'process' stored information about database performance.

In one example, data-processing agent may categorize detected index-reads (e.g. in accordance with an execution plan of a database statement which triggered the index read and/or in accordance with whether or not the index read is performance accelerating or associated with index maintenance), and determine from information about when given "index-read" operations take place (and the category or type of index read) a fractional aggregate index-read wait time (i.e. for any 'category' and/or a total aggregate index-read wait time) for a given database index.

It is appreciated the data storage 318 may store data other than the performance data. The data of the data storage 318 may be accessible by any number of executing processes on a single computer 110 or from multiple computers. Furthermore, data storage 318 may be implemented in any combination of volatile memory 160 (including but not limited to RAM) and non-volatile storage 140 (including but not limited to magnetic storage and flash storage).

Exemplary routines for data collection, data analysis, and presenting performance data are discussed below with reference to FIGS. 4-6.

As with any embodiment of the present invention, the system of FIG. 2 as a whole as well as each individual component may all reside on a single computer 110 or may be 'distributed' among more than one computer 110 in communication via a local or wide-area computer network.

Database server 310 or database management system is typically a relational database, including but not limited to Oracle®, SQLServer®, Sybase®, IBM DB2®, and MySQL®.

As used herein, an 'agent' (for example, collector agent 314 or data storage agent 326) refers to computer code (i.e. stored on a computer-readable medium) operative to carry out one or more tasks. The computer code may be implemented in any single computer language or combination of computer languages, including but not limited to machine-readable code (for example, machine language or assembler), so-called intermediate code (for example, Java byte code or .NET), compiled code (for example, compiled C++ code), and human readable code (for example, query language code such as SQL; for example, scripting code). The agent may be deployed in any number of process spaces, and on any number of computers 110 (for example, residing on a single computer 110, or the agent may be 'distributed' among a plurality of machines).

A 'collector agent' is operative to collect performance data an on ongoing basis—i.e. by collecting a sample of performance data at different times (i.e. repeatedly collecting different samples of performance data). In one non-limiting example, the collector agent includes one or more computer-executable code modules stored on a storage medium.

A "database-processing agent" is operative to process or analyze performance data. In one non-limiting example, the data-processing agent includes one or more computer-executable code modules stored on a storage medium.

In the example of FIG. 2, the system provides a user interface 330 (for example, a graphic user interface (GUI)) for presenting (i.e. displaying, for example, on a computer screen) performance data in accordance with at least one of an aggregate wait time for index reads for a given index and/or an aggregate wait time for index reads for a given index of CATEGORY A (i.e. performance accelerating) and/or an aggregate wait time for index reads for a given index of CATEGORY B (i.e. index overhead or maintenance).

Performance-data collector agent 314, data storage 318, and data-processing agent 322 are collectively referred to as a performance-data handler 326.

Discussion of FIG. 3

Before describing various flowcharts of routines for estimating aggregate wait times of index-read operations (i.e. total and/or of a certain category such as index-overhead read operations), an exemplary non-limiting use case is described.

In the example of FIG. 3, index-read operations that are performance-accelerating index-read operations (i.e. in accordance with a directive from the Query Optimizer) are illustrated as broken lines—these are index-reads 1, 2, 4 and 6. Index-read operations that are index-overhead or index-maintenance index-read operations (i.e. not explicitly requested by the Query Optimizer) are illustrated as solid lines—these are index-reads 3 and 5.

The 'wait-time' associated with index-read 1 is $t3-t1$.
The 'wait-time' associated with index-read 2 is $t4-t1$.
The 'wait-time' associated with index-read 3 is $t3-t2$.
The 'wait-time' associated with index-read 4 is $t4-t2$.
The 'wait-time' associated with index-read 5 is $t6-t4$.
The 'wait-time' associated with index-read 6 is $t7-t5$.

Thus, in the example of FIG. 3: the total aggregate wait time for the 'given index' is $2*t3+t4+t6+t7-2*t1-2*t2-t5$.

A first portion or fraction (i.e. less than 100% and more than 0%) of the aggregate index-read of the total aggregate wait time is attributable to performance-accelerating index-read operations—the aggregate read time of this first portion or fraction (i.e. see the broken lines) is $t1+2*t4+t7-2*t1-t2-t5$. This may be referred to as a 'fractional aggregate index-read time' because it is only a fraction of the total index-read wait time, and is associated with only a proper sub-set of all index-read operations (i.e. index-read operations 1, 2, 4 and 6 which are performance-accelerating).

A second portion or fraction (i.e. less than 100% and more than 0%) of the aggregate index-read of the total aggregate wait time is attributable to index-maintenance or index-overhead index-read operations—the aggregate read time of this second portion or fraction (i.e. see the solid lines) is $t3+t6-t2-t4$. This also may be referred to as a 'fractional aggregate index-read time' because it is only a fraction of the total index-read wait time, and is associated with only a proper sub-set of all index-read operations (i.e. index-read operations 3 and 5 which index-maintenance).

Figure 4:
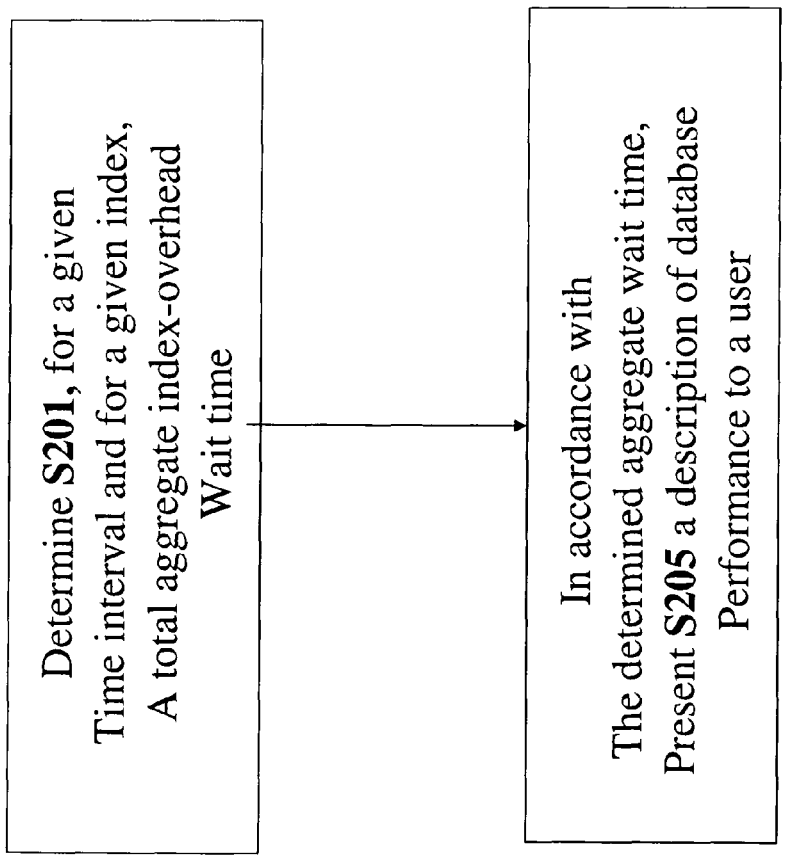
FIG. 4, 6A-6C, 7-8 are flow charts of routines for performance-monitoring a database in accordance with some embodiments.

Discussion of FIG. 4

FIG. 4 presents a flow chart describing an exemplary routine for presenting a description of database performance data in accordance with some embodiments of the present invention.

In step S201, wait time data (for example, wait relating to aggregate wait times of "index-read" operations during a time interval—i.e. either the entire wait time or a fractional aggregate wait time based on a type or category of index-read—for example, an aggregate 'index-maintenance' wait time) is collected S201 for at least one index (i.e. on a per-index basis).

In step S205, a description of database performance (i.e. one or more aspects of database performance) is presented to a user in accordance with the fractional 'index-read" aggregate wait time (e.g. index-overhead) data obtained in step S201.

Figure 8:
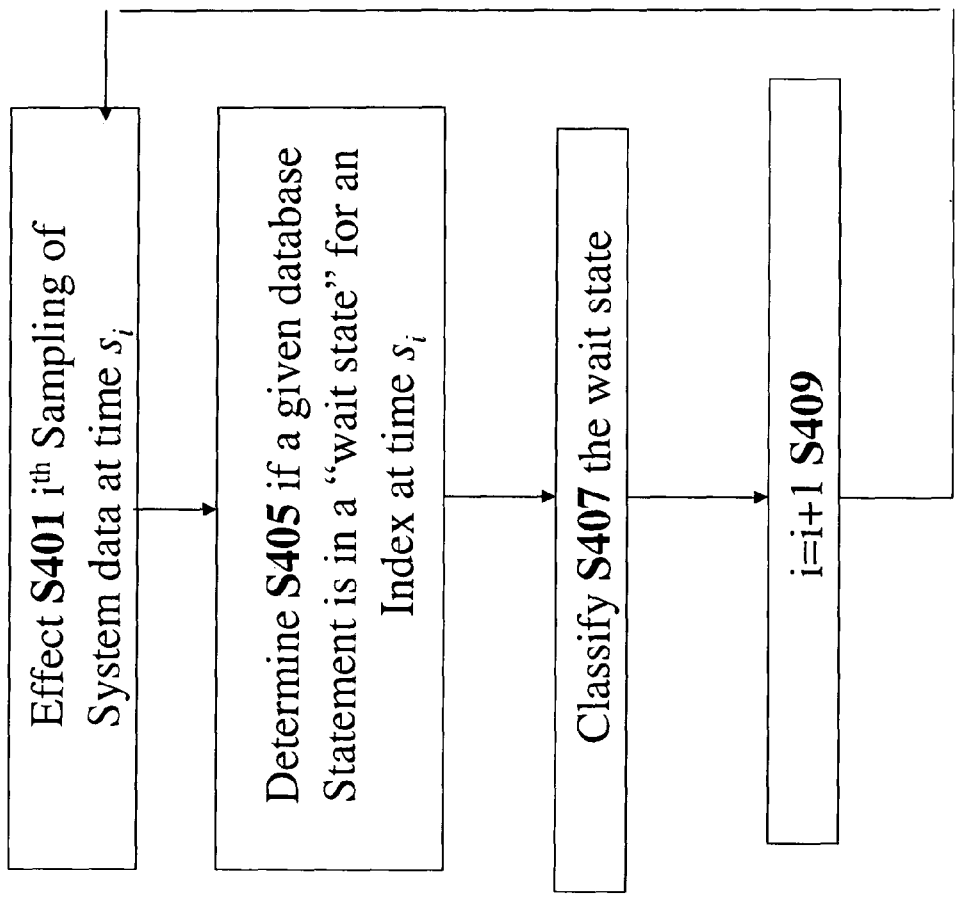

In some embodiments, the description of database performance describes a portion of the total wait time—thus would be, in the example of FIG. 3, $[t3+t6-t2-t4]/[2*t3+t4+t6+t7-$ 2*t1−2*t2−t5]. In the example of FIG. 8B, this would be 72%. This information may be displayed as a number or as a graph or any other manner.

Figure 5A:
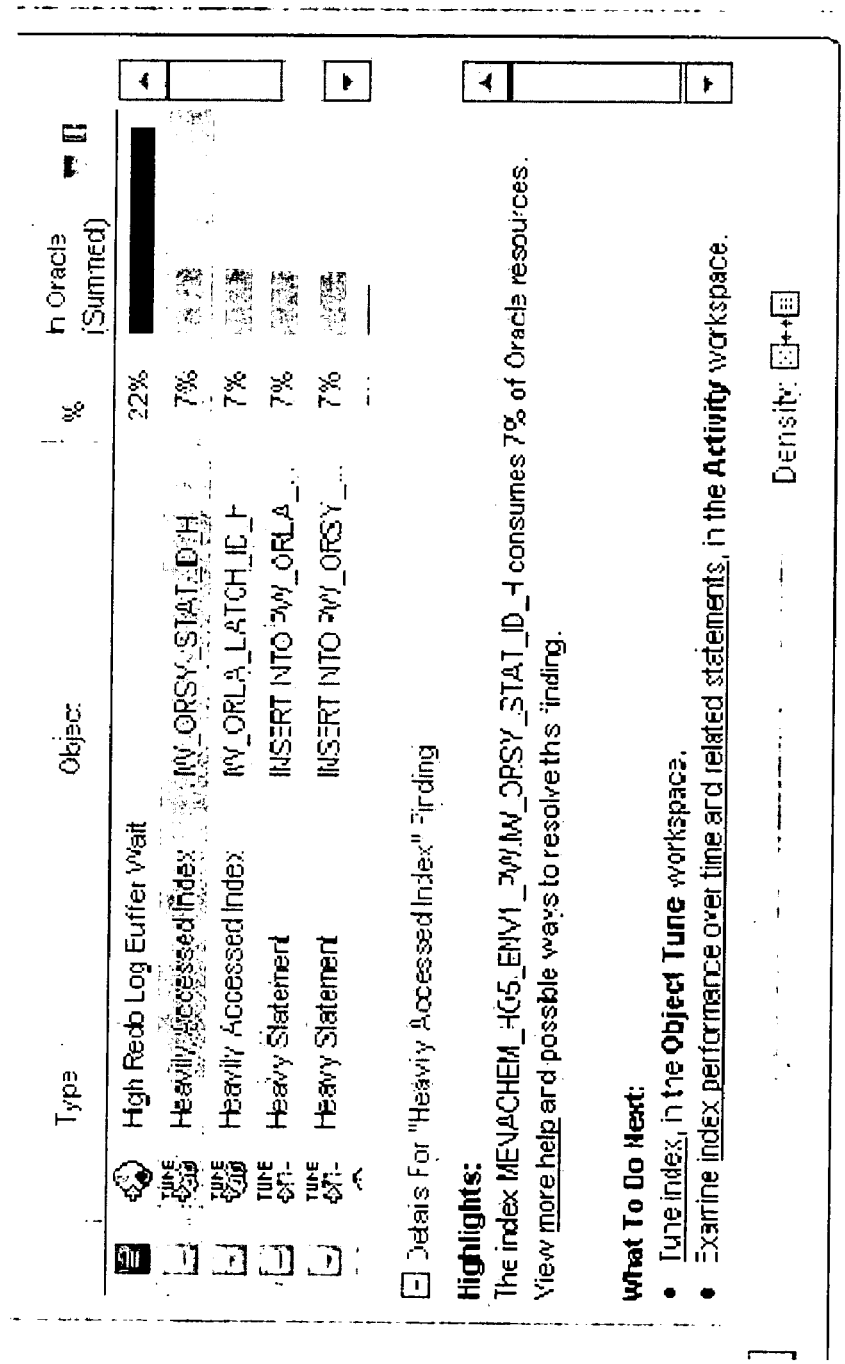
FIGS. 5A-5C are screen shots of an exemplary interface for presenting database performance-data in accordance with aggregate categorized index wait time (e.g. categorized according to execution plan) and/or aggregate "index-overhead" wait time.
Figure 5B:
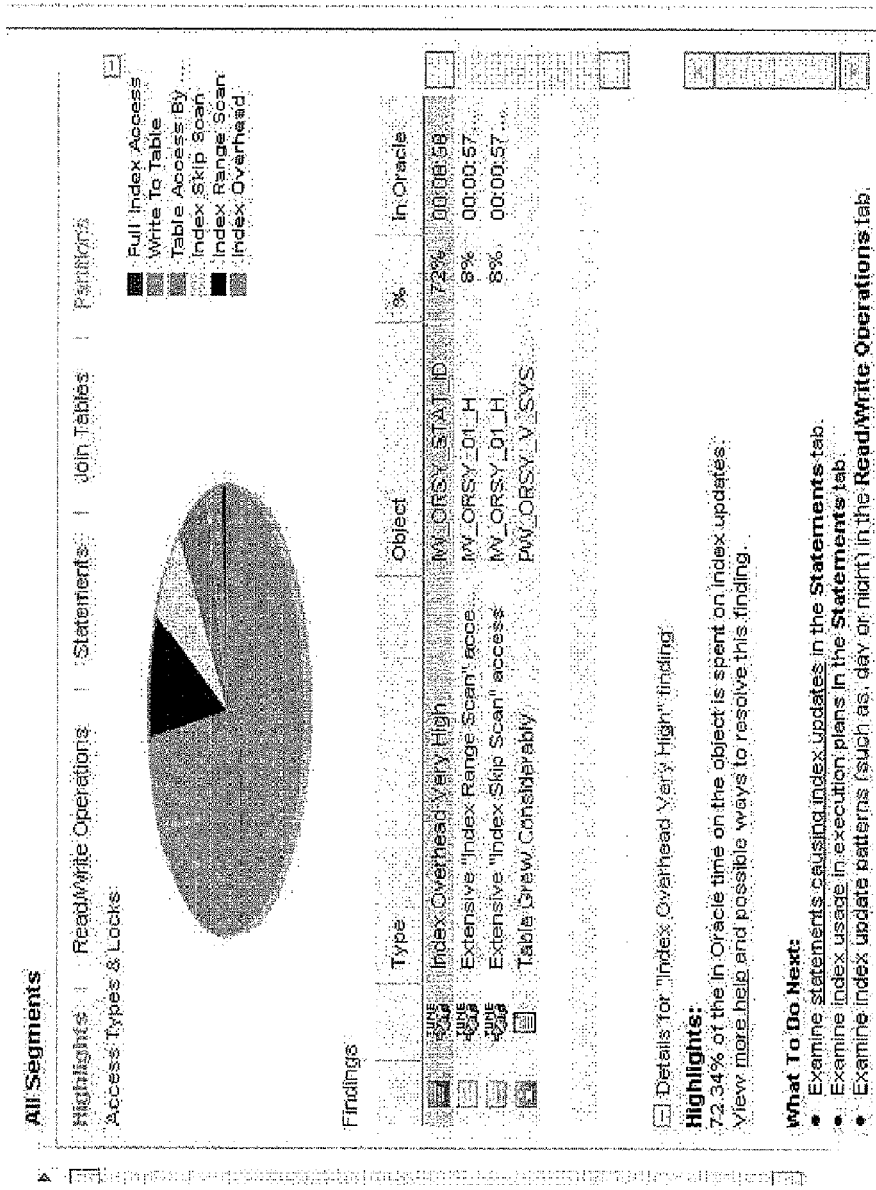
Figure 5C:
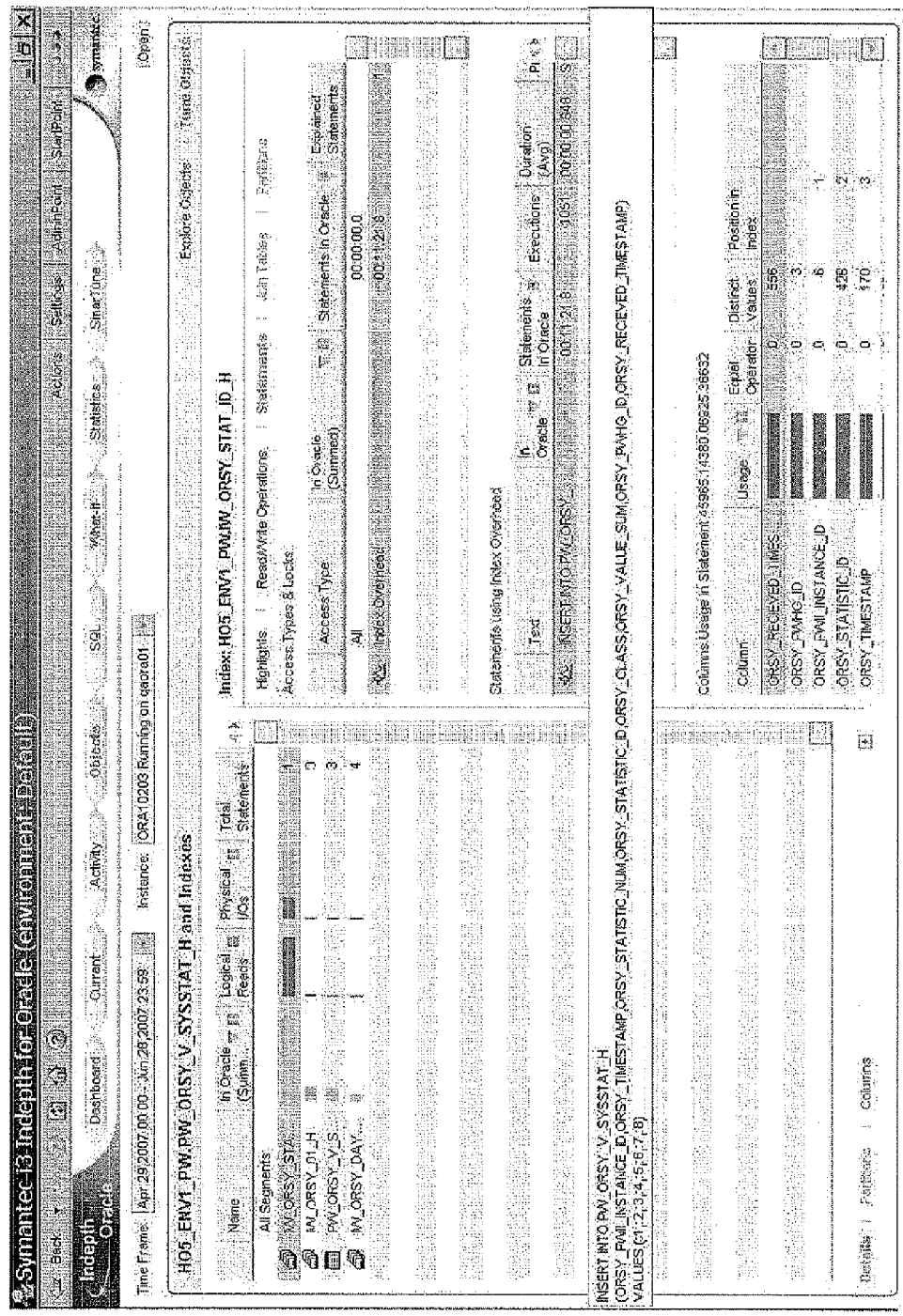

Discussion of FIGS. 5A-5C

FIG. 5A is a screen shot of an exemplary interface for displaying information related to database performance (e.g. on a computer screen). In the example of FIG. 5A, there are 2 heavily-accessed indexes: "IW_ORSY_STAT_ID_H" and "IW_ORLA_LATCH_ID_H." The user may engage a representation of one of the indexes (e.g. using a mouse click) to request 'drill-down' information relating to the what are the 'causes' of the index-read wait time according to various categories.

This is shown in FIG. 5B. In the example of FIG. 5B, index wait-time is classified accordance to 6 categories: "full index access." "write to table access," "rtable access by . . ." "index skip scan." "index range scan.' and 'index overhead' and the 'fraction' of each 'fractional wait time' is shown. The last category relates to cases where the index is read (i.e. as a result of execution of the invoking or triggering database statement) when the index (i.e. an identity of the index) does not appear in the execution plan. In the example of FIG. 5B, 72% of the total wait time (i.e. the total wait time of the index-reads during the time interval) is attributable to 'index-overhead' read time.

In the example of FIG. 5C, it is shown that fort for the database statement "INSERT INTO PW_ORSY_" which executed 1051 times during the time interval, the aggregate index overhead wait time is 11 minutes and 21.8 seconds.

Figure 6A:
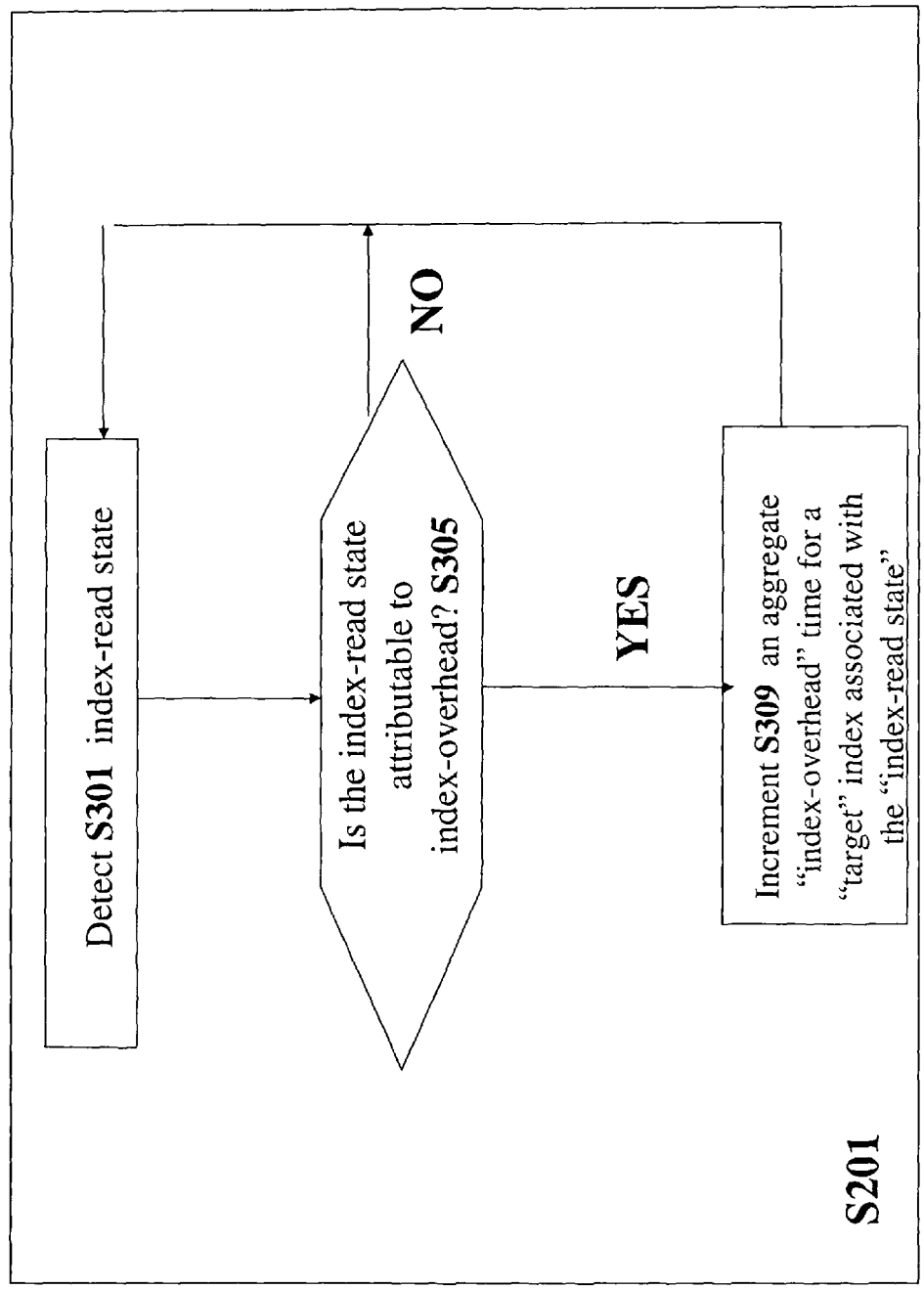
Figure 6B:
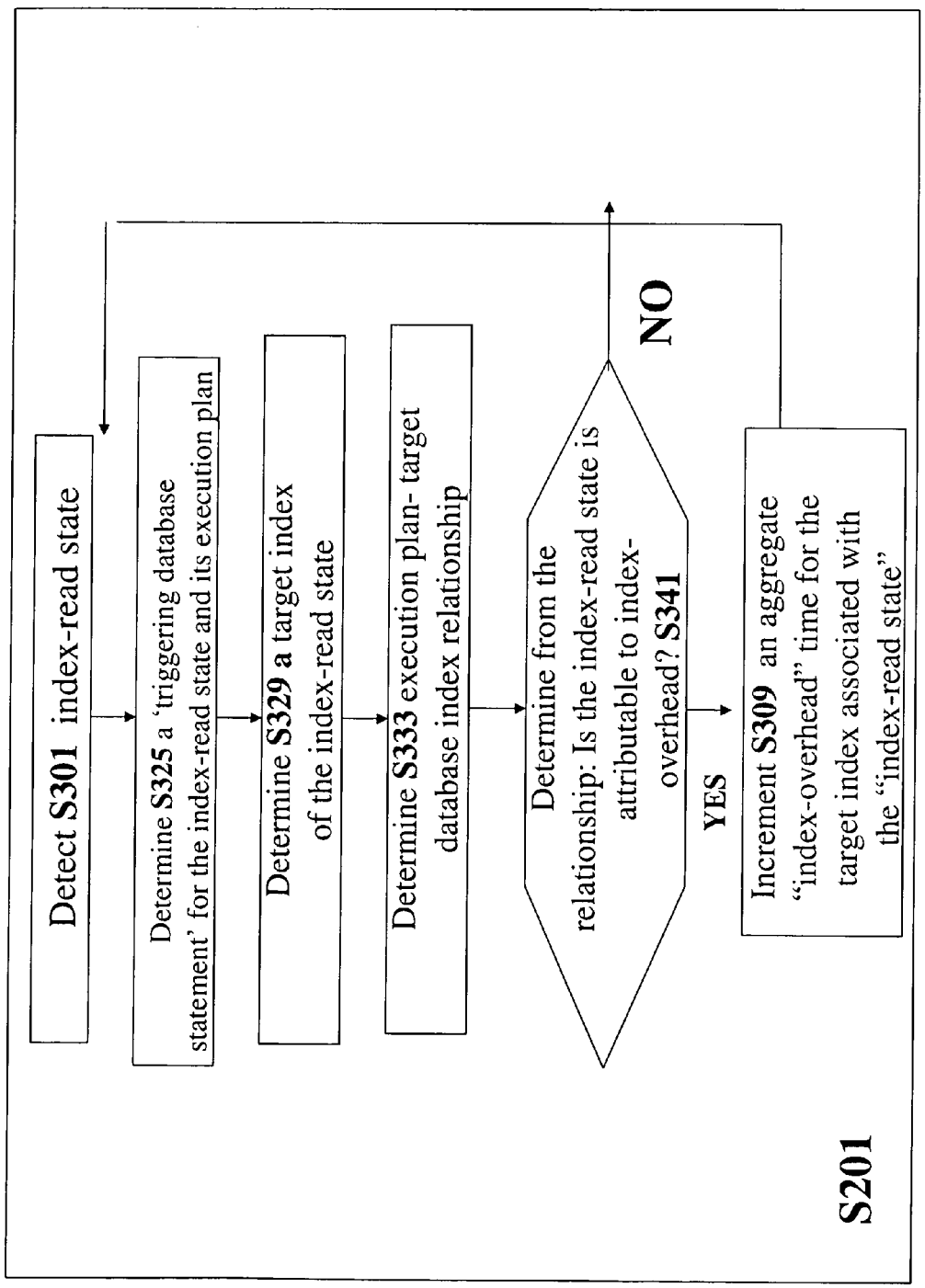
Figure 6C:
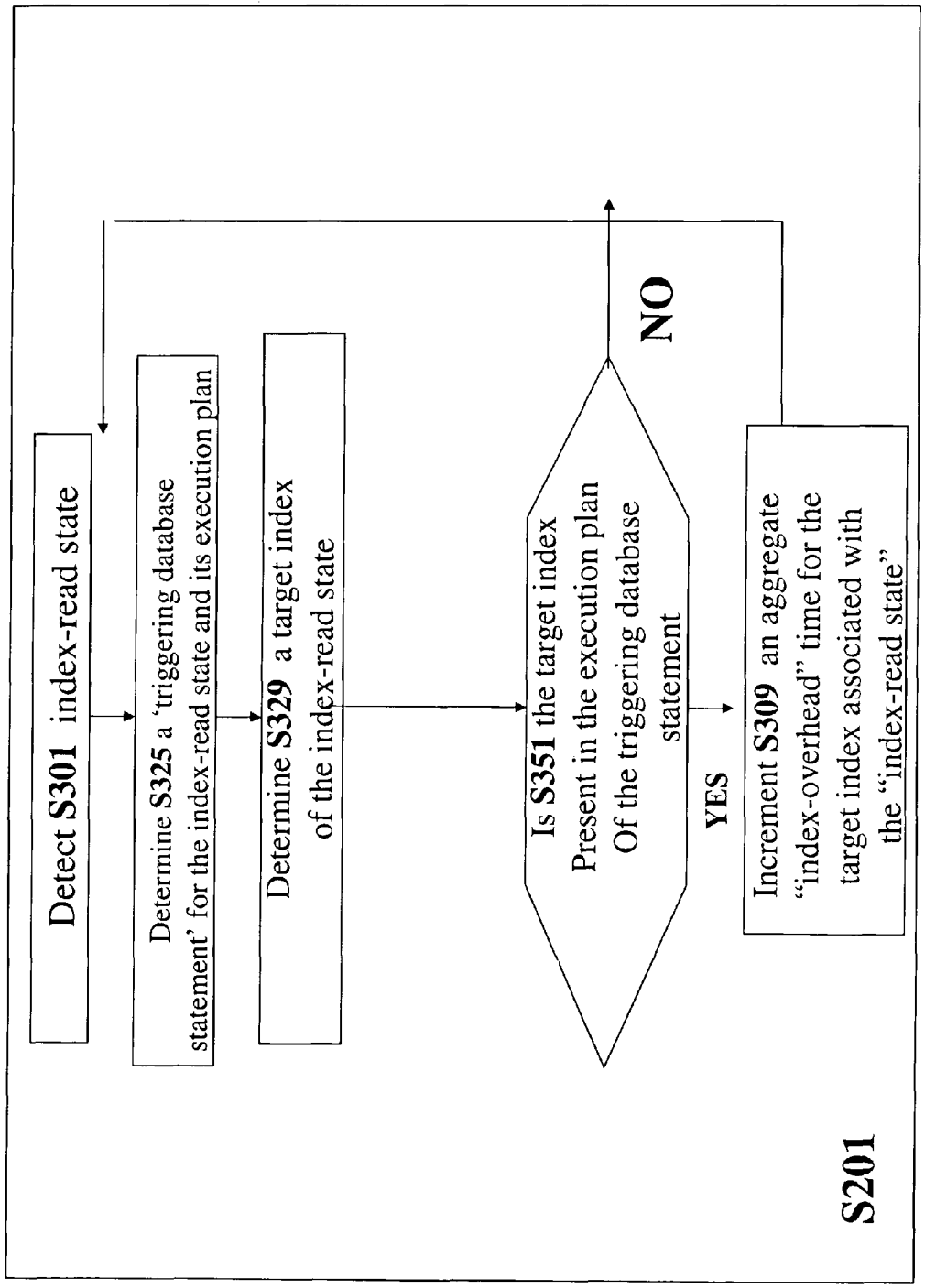

A Discussion of FIGS. 6A-6C

Reference is now made to FIG. 3A. In step S301, it is detected whether or not a given database statement is "waiting" for index-read of a given index. This may be done, for example, by accessing 'system data' of the relational database—for example, by reading a system table or by accessing system memory.

In step S305, it is determined with the index-read state is attributable or not to index-overhead. For example, this may be done by analyzing the execution plan (i.e. real or estimated) of the database statement 'waiting' for the index, and determining if an identifier of the index is present in the execution plan.

In the event that the index-read statement is attributable (i.e. according to some defined criteria), then some total aggregate 'index-overhead' time for the 'target index' is incremented by an amount of time associated with the detecting of step S301—for example, a total amount of time it is estimated that the index-read state has prevailed, or an amount of time since the most recent invoation of step S301 or any other way to determine a wait time.

In the example of FIG. 5B, the step of determining S325 the triggering or invoking database statement and its execution plan is shown. Also shown is the step of determining S329 an identifier of a target index of the index-read state—this may be done, for example, by determining an identity of a file(s) (or block(s) within) which the database statement is 'accessing,' and using some sort of relationship data structure describing relationships between files (or blocks) and the index. Also shown if the step of determining an execution plan-target database relationship (i.e. by analyzing an estimated or real execution plan—once the execution plan is known it is possible to detect the presence or absence of reference(s) to the index or the type of reference(s) to the index within the execution plan). In step S341, it is determined from the relationship if the index-read state is attributable to index-overhead.

In the example of FIG. 5C, in step S351 it is specifically shown that the decision of whether or not the index-read state is a read state associated with 'index-overhead' may be in accordance with whether or not an identifier of the target index is present in the execution plan.

FIG. 6 shows that the techniques of any of FIGS. 5A-5C may be generalized beyond the specific case of determining index-overhead. Thus, in step S333 the execution-plan target data index relationship may determined (for example, in accordance with a type of index-read of the target index in the execution plan—full index access, write to table, etc). In step S361, the index-read time is categorized in accordance with the relationship determined in step S331. In step S371 the appropriate aggregate read time is incremented. The technique of FIG. 6 may be useful for different categories of index-read wait time shown in FIG. 5B.

Figure 7:
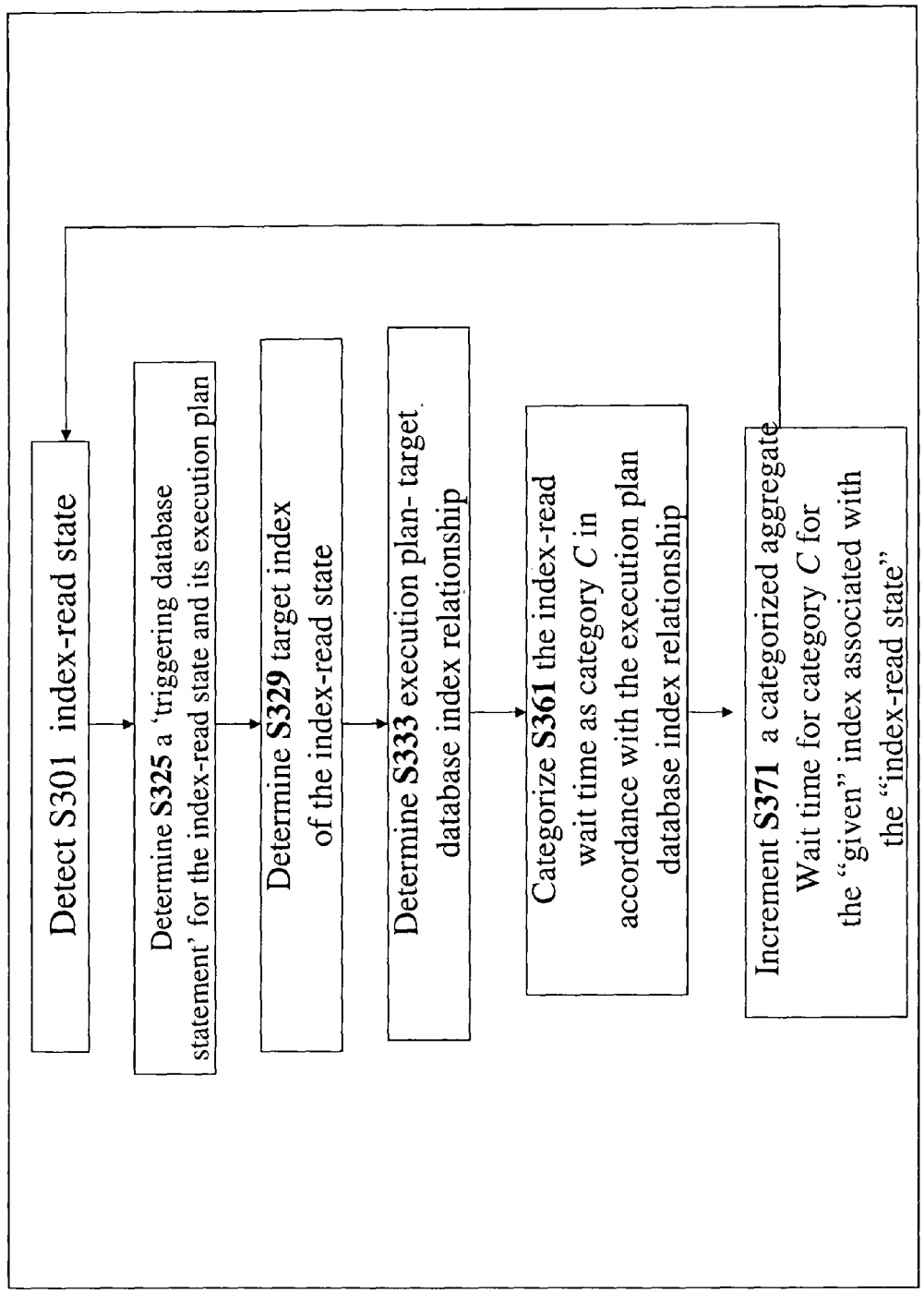

A Discussion of FIG. 7

Reference is now made to FIG. 7, which is a flow chart for a technique for tracking "index-read" states and associated wait times in accordance with some embodiments.

In step S401, system data of the database is read (for example, by sampling system memory or by reading or one or more system data structures of the database) for example, repeatedly over a period of time (for example, every second or every ½ second or every two seconds, etc etc). There is no requirement that the rate at which the system data is read remain constant (however, this is indeed possible). In one example, the system data is read a given time, then again 2 seconds later, then again 1 second later, then again 2 seconds later, etc etc.

One example of multiple 'system data sample times' is illustrated at the bottom of FIG. 3, where system data may be read first at time $S_1$, and then at time $S_2$, and then at time $S_3$, etc.

For each sampling (see step S405), it is determined which database items (for example, statements or table or indexes) and are in the "index-read" state.

In addition, it may be possible to quantify an amount of wait time associated with the "index-read" state in accordance with a "time gap" between a 'current' sampling time of step S401 $S_i$ and a previous (i.e. the immediate predecessor) sampling time $S_{i-1}$ of step S401. (i.e. a previous execution).

Thus, referring to FIG. 3, to "index-read 1" it is possible to determine an estimated value of an aggregate "index-read" wait time (i.e. whose exact value was given above as $(t_3-t_1)$ as follows:

(i) we start with an aggregate "index-read" time of 0 for index-read 1;

(ii) at sampling time $S_0$, we see that the 'index-read 1' state does not prevail;

(iii) at sampling time $S_1$, we see that "index-read 1' does prevail—thus we increment the aggregate time by $S_1-S_0$;

(iii) at sampling time $S_2$, we see that "index-read 1' does prevail—thus we increment the aggregate time by $S_2-S_1$;

(iv) at sampling time $S_3$, we see that 'index-read 1' state does not prevail.

Thus, the total aggregate time of 'index-read 1' may be measured as $S_1-S_0$ which approximates $t_3-t_1$.

This may be carried out for determining index-read wait time all index-reads of FIG. 3 or any other index-reads—index-read wait time may then be classified as explained herein.

Additional Discussion

It is further noted that any of the embodiments described above may further include receiving, sending or storing instructions and/or data that implement the operations described above in conjunction with the figures upon a computer readable medium. Generally speaking, a computer readable medium may include storage media or memory media such as magnetic or flash or optical media, e.g. disk or CD-ROM, volatile or non-volatile media such as RAM, ROM, etc. as well as transmission media or signals such as electrical, electromagnetic or digital signals conveyed via a communication medium such as network and/or wireless links.

In the description and claims of the present application, each of the verbs, "comprise" "include" and "have", and conjugates thereof; are used to indicate that the object or objects of the verb are not necessarily a complete listing of members, components, elements or parts of the subject or subjects of the verb. All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably with, the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method for displaying information related to performance of a multi-index database having a plurality of indexes during a time interval, the method comprising:
   a) for each index-read detecting of a plurality of index-read detectings that occur during the time interval:
      i) determining an identity of the target index and a data-writing triggering data-writing database statement of the detected index-read;
      i) quantifying a respective amount of wait time associated with the index-read detecting; and
      iii) in accordance with an execution plan of the triggering data-writing database statement, classify the detected index-read as either a performance-accelerating index-read or an overhead index-read;
   b) for each index of a plurality of indexes of the database, determining, in accordance with results of the quantifying and classifying operations, a respective aggregate index overhead wait time for the time interval; and
   c) in accordance with one or more of the determined index overhead wait times, presenting, to a user, data describing performance of the database during the time interval.

2. The method of claim 1 wherein the data presenting includes presenting, for a given index of the plurality of indexes, a representation of a non-unity and non-zero ratio between:
   i) a total aggregate overhead index-read wait-time for the given index; and
   ii) a total aggregate index-read wait-time for the given index.

3. The method of claim 1 wherein the data presenting includes presenting, for a given index of the plurality of indexes, a representation of a non-unity, non-zero ratio between:
   i) a total aggregate overhead index-read wait-time for the given index; and
   a total aggregate performance-accelerating index-read wait-time for the given index.

4. A method for displaying information related to performance of a database during a time interval, the method comprising:
   a) during the time interval, effecting a plurality of index-read detectings, each index-read detecting being associated with a respective quantity of wait-time;
   b) for each index-read detecting of the plurality of index-read detectings:
      i) determining an identity of a respective target index for the detected index-read;
      ii) determining an identity and an execution plan of a respective invoking database statement; and
      iii) determining a respective database index-execution plan relationship between the respective target index and the execution plan of the respective database statement;
   c) in accordance with:
      i) the wait-time quantities; and
      ii) target index-execution plan relationships,
   determining, for a given index of the database and for the time interval, a fractional aggregate index-read wait time that is only a fraction of a total index-read wait time for the given index for the time interval; and
   d) in accordance with the fractional aggregate index-read wait times determined for one or more given indexes, presenting, to a user, a description of performance of the database during the time period.

5. The method of claim 4 wherein the execution plans are estimated execution plans.

6. The method of claim 4 wherein the execution plans are real execution plans, the method further comprises:
   e) monitoring the database during the time intervals to detect one or more real execution plans associated with the invoking database statement.

7. The method of claim 4 wherein the determined relationship is a presence-absence relationship describing if the respective target index is present in or absent from the execution plan of the respective triggering database statement.

8. The method of claim 4 wherein the fractional aggregate index-read wait time for the time interval describes a total index overhead during the time interval.

9. The method of claim 4 wherein:
   i) the method further comprises:
      e) determining a ratio between the fractional aggregate index-read wait time for the given index and a total index-read wait time for the given index; and
   ii) the description of the performance of the database during the time period is presented in accordance with the determined ratio.

10. The method of claim 9 wherein the presenting of the performance description includes presenting a description of the determined ratio.

11. The method of claim 9 wherein:
   i) for each database index of a plurality of database indexes, a respective ratio is determined; and
   ii) the presenting includes presenting each ratio to present a plurality of ratio descriptions.

12. The method of claim 4 wherein:
i) the method further comprises:
   e) for a given database table having a plurality of indexes determining a table-wide fractional aggregate index-read wait time in accordance with a respective fractional aggregate index-read wait times of each index of the plurality of indexes; and
ii) the description of the performance of the database during the time period is presented in accordance with the determined table-wide fractional aggregate index-read wait time.

13. The method of claim 4 wherein:
i) the method further comprises:
   e) for a given database table having a plurality of indexes, determining, from a respective fractional aggregate index-read wait times of each index of the plurality of indexes, a table-wide ratio between:
      A) a table-wide fractional aggregate index-read wait time; and
      B) a total wait-time for the database table; and
ii) the description of the performance of the database during the time period is presented in accordance with the determined table-wide ratio for the given database table.

14. The method of claim 4 wherein:
i) step (a) is carried out for a plurality of distinct database indexes; and
ii) the database performance description presenting include displaying a list of at least some of the database indexes of the plurality of database statements in accordance with the respective fractional aggregate index-read wait times for each database index of the plurality of database indexes.

15. The method of claim 14 wherein the displayed list of database indexes is sorted in accordance with relative values of the estimated aggregate fractional aggregate index-read wait times.

16. The method of claim 14 wherein the database statement list displaying includes:
i) selecting a sub-plurality of database indexes from the plurality of distinct database indexes in accordance with the relative estimated aggregate sort-query-results-on-disk wait times;
ii) presenting only the selected sub-plurality of database indexes.

17. A system for displaying information related to performance of a database during a time interval, the system comprising:
A) a processor operative:
   a) during the time interval, to effect a plurality of index-read detectings, each index-read detecting being associated with a respective quantity of wait-time;
   b) for each index-read detecting of the plurality of index-read detectings:
      i) to determine an identity of a respective target index for the detected index-read;
      ii) to determine an identity and an execution plan of a respective invoking database statement; and
      iii) to determine a respective database index-execution plan relationship between the respective target index and the execution plan of the respective database statement;
   c) in accordance with:
      i) the wait-time quantities; and
      ii) target index-execution plan relationships, to determine, for a given index of the database and for the time interval, a fractional aggregate index-read wait time that is only a fraction of a total index-read wait time for the given index for the time interval; and
B) a computer screen, in conjunction with the processor, operative in accordance with the fractional aggregate index-read wait times determined for one or more given indexes, to present, to a user, a description of performance of the database during the time period.

18. The system of claim 17 wherein the processor is operative such that the execution plans are estimated execution plans.

19. The method system of claim 17 wherein the processor is operative such that the execution plans are real execution plans, the processor is further operative to:
   e) monitoring the database during the time intervals to detect one or more real execution plans associated with the invoking database statement.

20. The system of claim 17 wherein the processor is operative such that the determined relationship is a presence-absence relationship describing if the respective target index is present in or absent from the execution plan of the respective triggering database statement.

* * * * *